May 23, 1967  P. F. GIRARD  3,321,021
LIGHTWEIGHT FOLDING ROTOR
Filed July 19, 1966  3 Sheets-Sheet 1
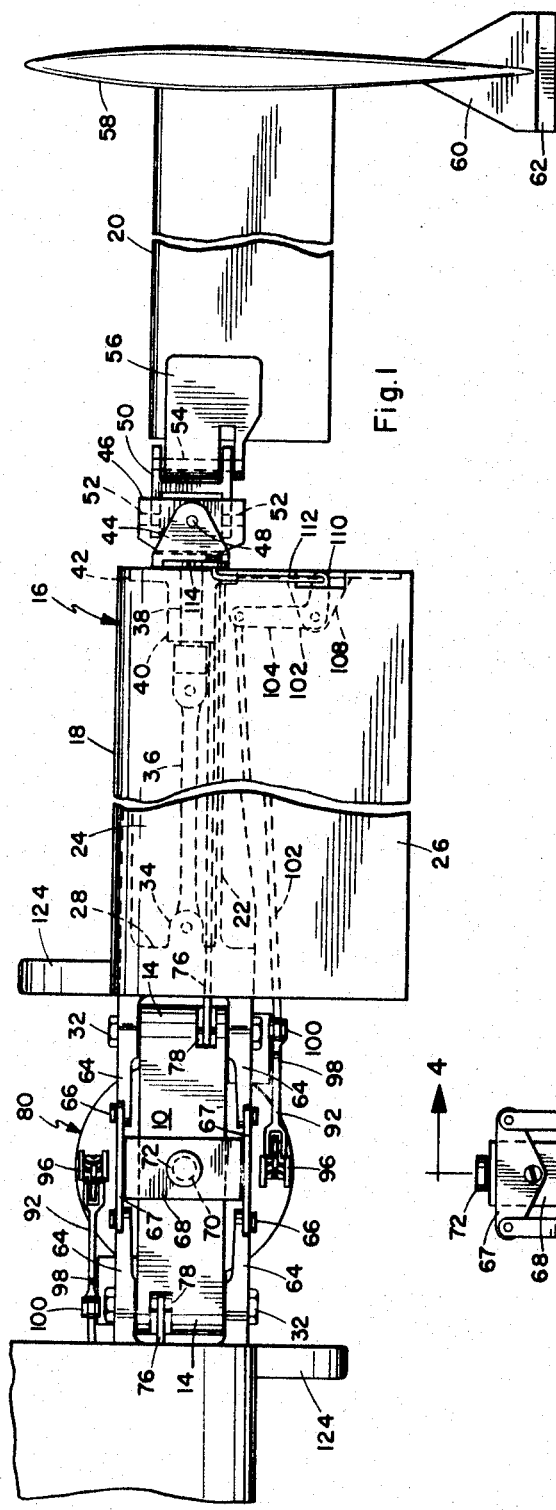
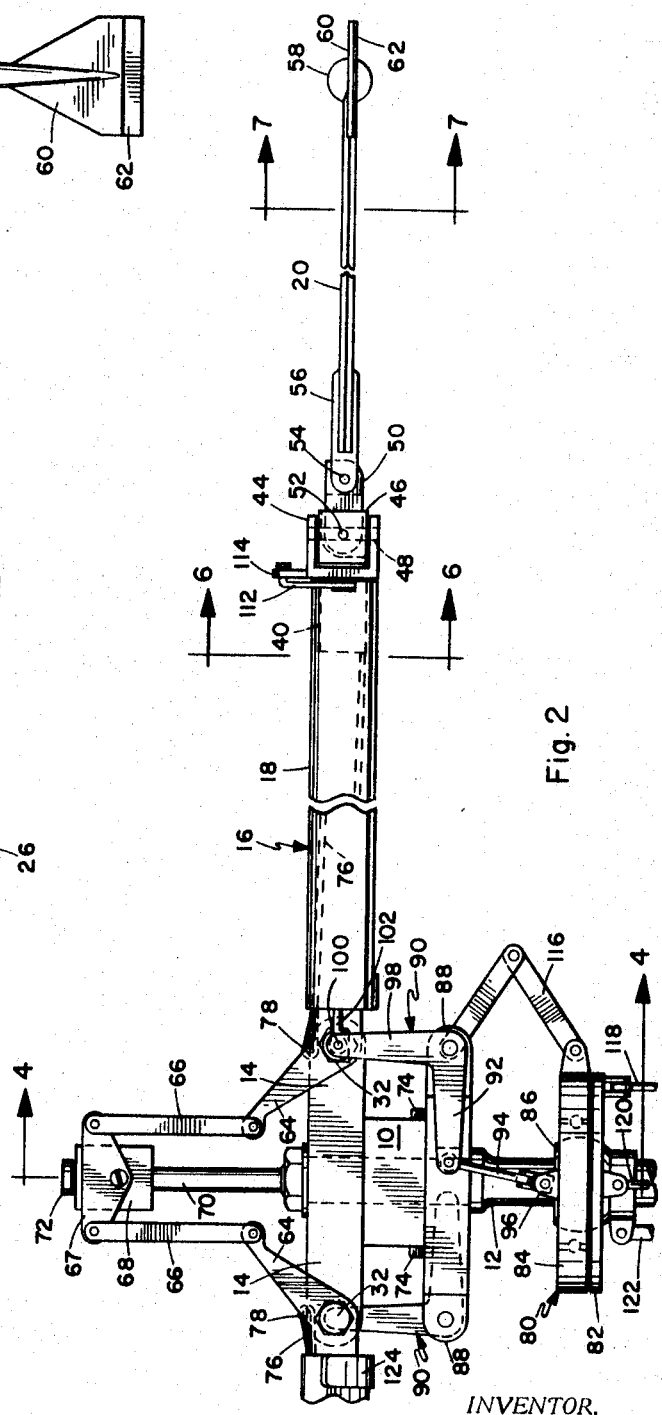
INVENTOR.
PETER F. GIRARD
BY
Knox & Knox

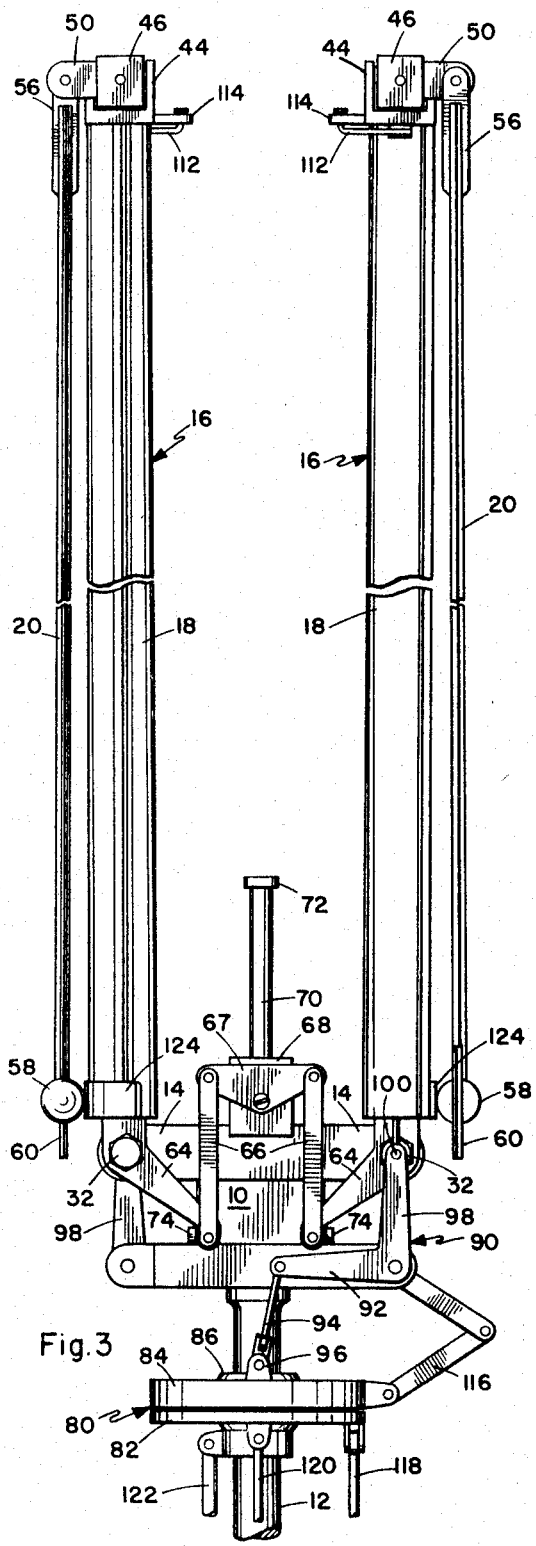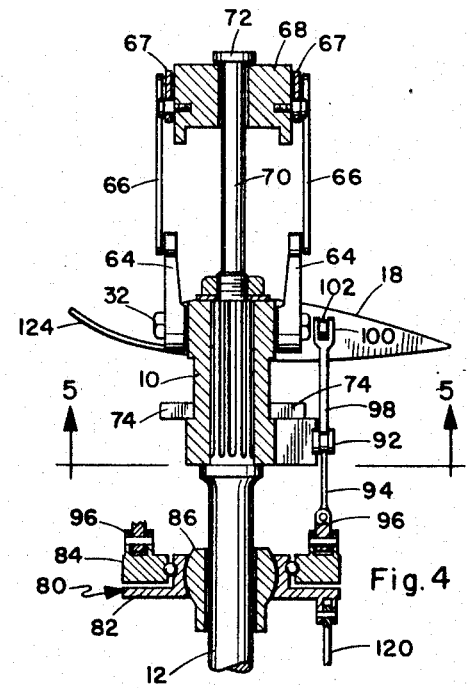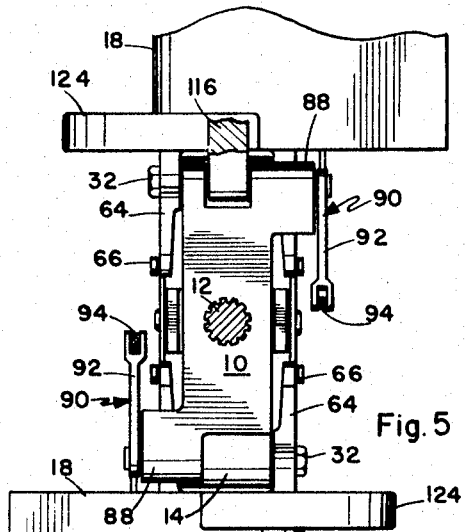

May 23, 1967   P. F. GIRARD   3,321,021
LIGHTWEIGHT FOLDING ROTOR
Filed July 19, 1966   3 Sheets-Sheet 3

INVENTOR.
PETER F. GIRARD
BY Knox & Knox

United States Patent Office 3,321,021
Patented May 23, 1967

3,321,021
LIGHTWEIGHT FOLDING ROTOR
Peter F. Girard, La Mesa, Calif., assignor to The Ryan Aeronautical Co., San Diego, Calif.
Filed July 19, 1966, Ser. No. 566,316
15 Claims. (Cl. 170—160.12)

The present invention relates to helicopters and specifically to a lightweight folding rotor.

Conventional helicopters are usually designed to compromise payload with vertical and horizontal speed and maneuverability characteristics. Heavy payload helicopters of the flying crane type have been developed but, because certain altitude and speed requirements are maintained, these are very large and have powerful engines. A need exists for helicopters having large payload capability without the need for excessive speed or climb performance, their utility being at very low altitude to carry construction materials, bridges, vehicles, or stores in specific areas at low speeds and with high stability. To minimize power requirements and reduce weight of the helicopter itself the disc loading of the rotor must be kept low, resulting in a very large diameter rotor. To facilitate transportation of the helicopter to its work area, when necessary, the rotor must be made collapsible, without complex structural and control arrangements.

The primary object of this invention, therefore, is to provide a helicopter rotor which is light in weight, very simple in construction and which will extend and fold entirely under the influence of rotational power, without complex linkage or actuating mechanism.

Another object of this invention is to provide a rotor in which load carrying structure is concentrated and minimized.

Another object of this invention is to provide a rotor which is self-adjusting to desirable aerodynamic characteristics in stable flight under power or in autorotation.

A further object of this invention is to provide a rotor which utilizes conventional helicopter drive and control means.

Another object of this invention is to provide a rotor which is balanced at all times during extension and retraction and does not tend to vibrate or oscillate while changing rotational speed.

The construction of the rotor and its action are illustrated in the drawings, in which:

FIGURE 1 is a top plan view of the rotor hub and one complete blade assembly in extended position;

FIGURE 2 is a side elevation view of the structure of FIGURE 1;

FIGURE 3 is a side elevation view showing both blades completely folded;

FIGURE 4 is a sectional view taken on line 4—4 of FIGURE 2;

FIGURE 5 is a sectional view taken on line 5—5 of FIGURE 4;

Similar characters of reference indicate similar or identical elements and portions throughout the specification and throughout the views of the drawing.

Figure 6:
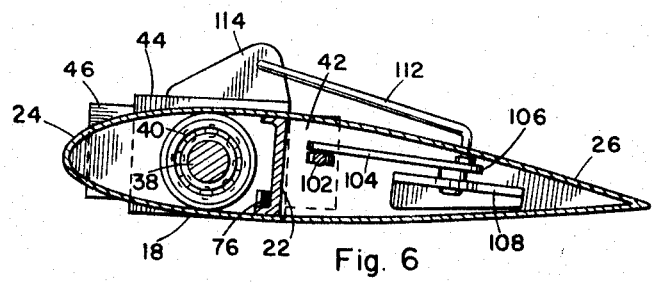
FIGURE 6 is an enlarged sectional view taken on line 6—6 of FIGURE 2.

The rotor has a hub 10 which is secured on a drive shaft 12, normally vertical, driven by any suitable power unit. A simple two-bladed rotor is shown and the structure will be described for such, but three or more blades could be used if necessary. At the top of hub 10 are opposed lateral arms 14 which carry the rotor blades, the two blades being identical. Each blade assembly 16 comprises an inner blade 18 and an outer blade 20 of substantially equal length. Inner blade 18 is a built-up airfoil structure having a longitudinal spar 22, a hollow leading edge box 24 and a trailing portion 26, and may be made with spaced ribs or a core of foam or honeycomb supporting outer skins, the various types of structure being well known. At the root end of inner blade 18 is a root fitting 28 suitably connected to spar 22 and adjacent structure, the root fitting having an extended fork 30 which straddles an arm 14 and is held by a hinge pin 32 perpendicular to shaft 12, so that the blade can hinge upwardly. Root fitting 28 has a lug 34 inside box 24, a tension member 36 being attached to said lug and extending longitudinally through said box. Attached to the outer end of tension member 36 is a pitch hinge pin 38 journalled in a bearing 40 on an axis longitudinal to the blade, said bearing being part of an outer end fitting 42 of blade 18. The end fitting 42 may comprise the complete end rib member of the inner blade to simplify structure. Tension member 36 carries a major portion of the centrifugal load on the rotor, so the blade structure can be light and bearing 40 can be a simple radial bearing or even a sleeve. For maximum efficiency the tension member is preferably made from a stack of thin strap elements secured at their ends, or a cable type element, so that localized wear or damage will not cause complete breakage of the member.

Fixed to the outer end of pitch hinge pin 38 is a lag hinge fork 44 in which a block 46 is pivotally held by a pin 48 perpendicular to pin 38. Attached to block 46 is one end of a folding link 50, held by pins 52 perpendicular to pins 38 and 48, the other end of said link being pivotally connected by a further pin 54, parallel to pin 52, to inner end fitting 56 on the outer blade 20. When the outer blade is at substantially zero pitch position the hinge pins 52 and 54 are parallel to hinge pin 32, so that the outer blade will fold down as the inner blade folds up. Link 50 provides spacing so that the two blade portions can lie side by side in generally parallel relation when folded.

Figure 7:
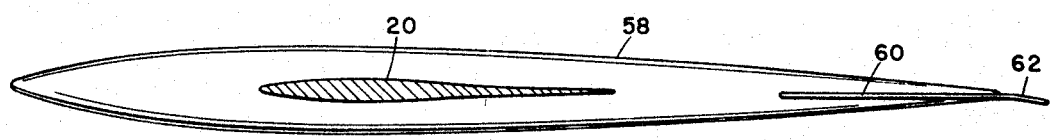
FIGURE 7 is an enlarged sectional view taken on line 7—7 of FIGURE 2.

At the outer end of outer blade 20 is a streamlined flyweight 58 fixed chordally to the blade, the trailing end of the flyweight having a stabilizing vane 60 generally parallel to the outer blade, with the rear edge of the vane turned slightly to form a trim tab 62. The outer blade 20 is a thin, somewhat resilient, unitary member which could be a flat strip, but is preferably of an airfoil shape with the forward portion thickened, as in FIGURE 7. This section brings the center of mass of the blade forward near the aerodynamic center of pressure and eliminates the need for balance weights or surfaces on the outer blade. On small rotors using a flat section outer blade for simplicity, a forwardly extending balance weight (not shown) could be used for static and dynamic balance, the principle being well known.

At the root of inner blade 18 the fork 30 has inwardly extended parallel arms 64 inclined upwardly at an angle of about 45 degrees to the plane of the blade. The arms 64 of the two inner blades are pivotally connected by links 66 to an equalizing plate 67 which is pivotally mounted on a sliding block 68, which slides vertically on an upward extension 70 of drive shaft 12. The blades are thus interconnected to move in unison to maintain balance of the rotor at all times. At the upper end of shaft extension 70 is an extension stop 72 which limits upward movement of block 68 and controls outward extension of the blades, to prevent undesirable drooping of the inner blades below the horizontal due to unusual circumstances. The upward of folded position of the blades is held by stops 74 projecting from hub 10 to engage the arms 64, as in FIGURE 3.

It will be obvious that the blades are extended to their operating position by centrifugal force and only require some means for retraction to afford completely automatic operation. For simplicity an elastic retraction member 76 is passed through the leading edge box 24, the outer end being secured to end fitting 42 or adjacent structure adjacent the lower skin of the blade. The inner end of the retraction member 76 is attached to a fitting 78 on arm 14 above and slightly inboard of the axis of hinge pin 32. The over center type of coupling results in the retraction member being stretched when the blade is extended. Various types of retraction members may be used, involving springs and the like, but the actual elongation is small and the force involved fairly high if the rotor is large. It has been found that a member made from strands of glass fiber has the required characteristics, the elongation factor being small but the tension force being high. The material is exceptionally wear resistant and has a good dimensional memory, that is, the fibers are not permanently stretched and will return to their normal length consistently after many stretching cycles. Also, the multiple fiber element prevents the possibility of complete failure from localized damage.

The inner blades 18 are fixed at a small positive angle of attack, only the outer blades 20 being varied in pitch by rotation in bearings 40. Pitch angle changes are small and the slight torsion applied to the tension member 36, which may be many feet in length, does not adversely affect control forces.

Pitch control is provided by a conventional swash plate 80 having a non-rotating portion 82 and a rotating portion 84, the non-rotating portion being universally pivotally mounted on a ball element 86 which is axially slidable on drive shaft 12. On the lower portion of hub 10 are opposed lugs 88 extending generally parallel to arms 14 and on each lug is pivotally mounted a bellcrank 90 having an arm 92, which is coupled by a connecting rod 94 to a universal fitting 96 on rotating portion 84. Bellcrank 90 has another arm 98 with a pivotal end connection 100 from which a push-pull rod 102 extends through the trailing portion 26 of the inner blade to the long arm 104 of a further bellcrank 106, which is pivotally mounted on a bracket 108 on end fitting 42. Bellcrank 106 swings generally in the plane of blade 18 and has a short arm 110 from which a connecting rod 112 leads to a horn 114 on top of fork 44. Motion of bellcrank 90 thus causes bellcrank 106 to rotate the fork 44, and with it the outer blade 20, about the axis of pin 38, to vary the pitch angle of the outer blade. In neutral pitch position the axis of pivotal connection 100 is coaxial with the axis of hinge pin 32, so that the linkage is not jammed or distorted by folding of the blades.

Rotating portion 84 is connected by a torque link 116 to one of the lugs 88 to rotate with hub 12. Control rods 118 and 120 connected to non-rotating portion 82 at spaced positions provide cyclic pitch and roll control, while a control rod 122 coupled to ball element 86 provides collective pitch control, from conventional helicopter controls. The control linkage and action are well known.

In operation, rotation of drive shaft 12 will cause the blades to extend by centrifugal force, the blades being free to vary their coning angle depending on rotational speed. The inner blades 18 are at a fixed positive pitch angle and develop lift at all times under power, while the outer blades 20 are actuated to control total lift and directional thrust. Centrifugal action on flyweights 58 will hold the outer blades stable, the trim tabs 62 causing the tips of the outer blades to ride at a slight negative pitch angle relative to the inner ends. Trim tabs 62 are shown turned downwardly, but it may be necessary to turn the tabs slightly upwardly in certain instances. The tip angle of incidence is negative only in relation to the root angle and may still be positive relative to air flow, and the torsional load in the outer blade will also have some effect on the angle at which the tip rides. Since the outer blades 20 are somewhat flexible this trim will result in a progressive wash-out from the inner end of the blade to the tip, which is an ideal aerodynamic arrangement and is obtained without special blade shaping or controls. As swash plate 80 is actuated the bellcranks 90 will transfer the motions to the forks 44 and vary the pitch of the outer blades accordingly. However, the tips tend to remain in their stable trimmed setting so the control action is most effective along the inner portions of blades 20 and decreases progressively toward the tips. It has been found that this provides ample control for all requirements within the designed range of performance for the rotor.

Auto-stability is inherent in the rotor in another manner by virtue of the control system used. Under centrifugal action the push-pull rods 102 are urged outwardly and, while motion is restrained by the linkage at the hub, there is sufficient reaction at bellcranks 106 to apply a slight increase in pitch to the outer blades 20. Thus any increase in rotational speed results in a corresponding increase in blade pitch, which absorbs the added effective power and prevents further increase in rotational speed. In practice the rotational speed is automatically stabilized, without governors or speed measuring means.

Under auto-rotation, without power, the tips of blades 20 still tend to track at their trimmed angle, while the inner ends are given the negative pitch angle necessary to sustain auto-rotation. This results in a progressive wash-in of pitch angle along the blade, which is aerodynamically desirable in auto-rotation.

Figure 8:
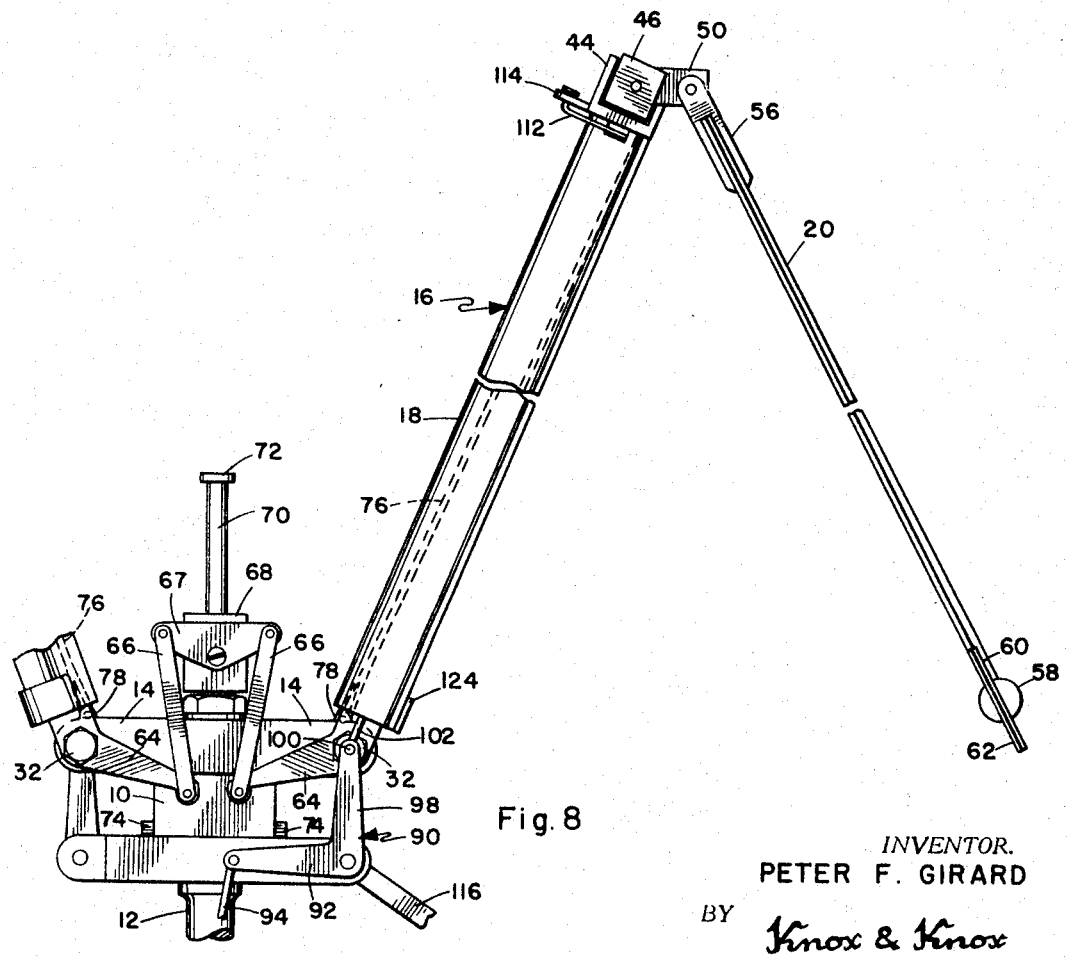
FIGURE 8 is a side elevation view of the rotor in partially folded condition.

When rotational speed decreases below that needed to keep the blades extended, the retraction members 76 will overcome the centrifugal force and pull the inner blades 18 upwardly and inwardly about hinge pins 32. The mass of flyweights 58 will cause outer blades 20 to hang from links 50 and the blades will gradually fold, as in FIGURE 8. Inertia of the blades decreases rapidly as they fold and their throw is reduced, so that the run down time of the rotor is short and excessive freewheeling is avoided. In addition the blades fold upwardly clear of the helicopter airframe and allow immediate access to the vehicle without danger.

As the rotor comes to a halt, any slight inertia remaining in flyweights 58 may cause the flyweights to overrun the inner blades, due to the flexibility of the outer blades and the hinge action about pins 48. To avoid collision of the flyweights with the hub mechanism small bumper plates 124 are fixed to the root ends of inner blades 18 and project forward from the leading edges thereof. In the folded position of the rotor the flyweights rest against the bumpers, as in FIGURE 3. Although the rotor is shown, in its preferred form, with flyweights on the blade tips, it should be noted that the mechanism is operable without the flyweights, the blades extending readily by centrifugal action without the added mass. Without the flyweights and their attached trim tabs there will be no automatic wash-in and wash-out action, but for some purposes this may be acceptable.

While the rotor as illustrated, with the foldable structure and simple control system, is adaptable to a variety of helicopter vehicles, it is particularly effective when made with very long blades to provide a large rotor disc. With such light weight structure it is feasible to operate the rotor at disc loadings on the order of ½ to 1 pound per square foot, as compared to 3 pounds per square foot or more for conventional helicopters. Such low disc loadings minimize power requirements and reduce structural loads.

For transportation of a helicopter using this type of rotor, it would be a simple matter to incorporate a hinge or joint (not shown) in the drive shaft, so that the rotor could be lowered to be generally horizontally disposed.

It is understood that minor variation from the form of the invention disclosed herein may be made without departure from the spirit and scope of the invention, and that the specification and drawings are to be considered as merely illustrative rather than limiting.

I claim:
1. A helicopter rotor, comprising:
   a shaft having a hub mounted thereon;
   a plurality of rotor blades attached to said hub, each of said blades including an inner blade and an outer blade pivotally interconnected to fold alongside each other in generally parallel relation;
   each inner blade having a root end fitting pivotally attached to said hub for the blade to swing upwardly;
   retraction means coupled between said blades and said hub to fold the blades;
   and pitch control means connected to said outer blades to vary the pitch angle thereof relative to said inner blades.

2. A helicopter rotor according to claim 1, wherein said blades are interconnected to extend and fold in unison.

3. A helicopter rotor according to claim 1, wherein the pivotal interconnection of said inner and outer blades includes pitch hinge means on which said outer blade is secured for rotation about an axis longitudinal to said inner blade;
   said inner blade being a substantially rigid, hollow airfoil element and having therein a load carrying tension member secured between said root end fitting and said pitch hinge means.

4. A helicopter rotor according to claim 1, wherein said outer blades are thin, resilient strap-like elements.

5. A helicopter rotor according to claim 1, and including flyweights on the tips of said outer blades, said flyweights extending chordally from said outer blades and having stabilizing vanes at the trailing ends thereof, said vanes having trim tab portions to hold the tip portions of the blades at predetermined pitch angles with respect to airflow in the direction of rotor rotation.

6. A helicopter rotor according to claim 1, wherein said pitch control means includes push-pull rods extending through said inner blades and having means at the inner ends thereof for connection to a helicopter control system;
   and linkage means coupled between the outer ends of said push-pull rods and said outer blades, by which outward motion of said push-pull rods causes the pitch angles of said outer blades to increase.

7. A helicopter rotor according to claim 1, wherein said retraction means comprises elastic elements secured between the outer end of each inner blade and a fitting on said hub above and inboard of the pivotal axis of the root end fitting of the particular blade.

8. A helicopter rotor according to claim 7, wherein said elastic elements are of glass fibers.

9. A helicopter rotor according to claim 1, wherein said inner and outer blades are of substantially equal length, the inner ends of said inner blades having bumper members extending forwardly therefrom against which said flyweights rest when the blades are folded.

10. A helicopter rotor, comprising:
    a shaft having a hub mounted thereon;
    a plurality of rotor blades attached to said hub, each of said blades including a rigid, hollow inner blade held at a fixed positive pitch angle relative to said hub, and a thin resilient outer blade pivotally connected to the inner blade to rotate about a pitch change axis longitudinal to the inner blade;
    said inner blade having a root end fitting with a hinge pin pivotally connecting the inner blade to said hub to swing upwardly thereon;
    said outer blade being hinged to said inner blade on an axis parallel to said hinge pin to fold alongside the inner blade;
    retraction means connected between said hub and said inner blades to fold the inner blades upwardly;
    and pitch control means connected to said outer blades to vary the pitch angle thereof relative to said inner blades.

11. A helicopter rotor according to claim 10 and including flyweights attached chordally to the tips of said outer blades, said flyweights having stabilizing vanes thereon with trim tab portions offset to guide the outer ends of said outer blades at predetermined pitch angles relative to said inner blades.

12. A helicopter rotor according to claim 10, wherein said pitch control means includes push-pull rods extending longitudinally through said inner blades and having means at the inner ends thereof for connection to a helicopter control system;
    bellcranks mounted at the outer ends of said inner blades and having linkage means coupled to said outer blades, said push-pull rods being connected to said bellcranks so that outward motion of the push-pull rods increases the pitch angles of the outer blades.

13. A helicopter rotor according to claim 10, wherein the hinge connection of said inner and outer blades includes a link hinged at one end to said inner blade and hinged at the other end to said outer blade, said link spacing the outer blade from the inner blade to lie substantially parallel thereto in folded position.

14. A helicopter rotor according to claim 10, and including arms extending inwardly from said root end fittings, an upward extension of said shaft above said hub, a block member slidable on said shaft, and equalizing link means connecting said arms to said block member, whereby the blades fold and extend in unison.

15. A helicopter rotor according to claim 14, and including stop means on said shaft extension to limit motion of said block member.

References Cited by the Examiner

UNITED STATES PATENTS

| | | | |
|---|---|---|---|
| 2,021,470 | 11/1935 | Upson | 170—160.11 X |
| 2,465,703 | 3/1949 | Allen | 170—160.11 X |
| 2,509,481 | 5/1950 | Crise | 170—160.12 X |

FOREIGN PATENTS

| | | |
|---|---|---|
| 728,062 | 4/1955 | Great Britain. |

MARTIN P. SCHWADRON, *Primary Examiner.*

E. A. POWELL, JR., *Assistant Examiner.*